US012311518B2

(12) United States Patent
Lu et al.

(10) Patent No.: US 12,311,518 B2
(45) Date of Patent: May 27, 2025

(54) IMPACT DRILL

(71) Applicant: Nanjing Chervon Industry Co., Ltd., Nanjing (CN)

(72) Inventors: Wei Lu, Nanjing (CN); Changwei Zuo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 149 days.

(21) Appl. No.: 17/846,495

(22) Filed: Jun. 22, 2022

(65) Prior Publication Data

US 2023/0009570 A1 Jan. 12, 2023

(30) Foreign Application Priority Data

Jul. 6, 2021 (CN) ......................... 202110760686.4

(51) Int. Cl.

| | |
|---|---|
| ***B25D 16/00*** | (2006.01) |
| ***B25F 5/00*** | (2006.01) |
| *B25B 21/02* | (2006.01) |
| *B25B 23/147* | (2006.01) |
| *B25D 11/10* | (2006.01) |

(52) U.S. Cl.

CPC ............ *B25D 16/006* (2013.01); *B25F 5/001* (2013.01); *B25B 21/02* (2013.01); *B25B 23/147* (2013.01); *B25D 11/106* (2013.01); *B25D 16/00* (2013.01); *B25D 2216/0023* (2013.01)

(58) Field of Classification Search

CPC .................. B25D 16/00; B25D 16/006; B25D 2216/0023; B25D 11/106; B25F 5/001; B25B 23/147; B25B 21/02

See application file for complete search history.

(56) References Cited

U.S. PATENT DOCUMENTS 5,458,206 A * 10/1995 Bourner .............. B25B 23/1405 173/104
6,457,535 B1 10/2002 Tanaka
(Continued)

FOREIGN PATENT DOCUMENTS

CN 101244553 A 8/2008
CN 201201225 Y 3/2009
(Continued)

OTHER PUBLICATIONS

EPO, extended European search report issued on European patent application No. 22180864.5, dated Dec. 1, 2022, 7 pages.

*Primary Examiner* — Robert F Long
*Assistant Examiner* — Eduardo R Ferrero
(74) *Attorney, Agent, or Firm* — Greenberg Traurig, LLP

(57) ABSTRACT

An impact drill includes a lock pin, a biasing element, a function conversion member and an operation member. The lock pin is connected to the locking ring. The biasing element is connected to the lock pin and provides a biasing force that causes the lock pin to press against the locking ring. The function conversion member includes a stop portion configured to stop the movement of the lock pin along the first axis and a release portion configured to allow the movement of the lock pin along the first axis. The operation member is connected to the function conversion member. The operation member is configured to drive the function conversion member to rotate around the first axis to switch the stop state of the movement of the lock pin along the first axis.

19 Claims, 11 Drawing Sheets

(56) References Cited

U.S. PATENT DOCUMENTS

| | | | | |
|---|---|---|---|---|
| 9,233,461 | B2 * | 1/2016 | Tomayko | F16H 3/666 |
| 2006/0201688 | A1 * | 9/2006 | Jenner | B25B 23/14 173/48 |
| 2009/0194305 | A1 | 8/2009 | Xu | |
| 2010/0163261 | A1 * | 7/2010 | Tomayko | B25D 16/00 173/217 |
| 2010/0193206 | A1 * | 8/2010 | Teng | B25B 21/02 173/48 |
| 2011/0147022 | A1 * | 6/2011 | Roehm | B25B 21/02 173/47 |
| 2011/0232930 | A1 * | 9/2011 | Zhang | B25F 5/001 173/178 |
| 2012/0255755 | A1 * | 10/2012 | Kondo | B25D 11/106 173/178 |
| 2013/0033217 | A1 * | 2/2013 | Hirabayashi | B25D 16/006 318/546 |
| 2013/0220655 | A1 * | 8/2013 | Tomayko | B25B 23/14 173/47 |
| 2013/0269461 | A1 * | 10/2013 | Hecht | B25D 11/106 74/335 |
| 2014/0110140 | A1 * | 4/2014 | Elger | B25D 11/106 173/48 |
| 2014/0274548 | A1 * | 9/2014 | Kelleher | B25B 23/141 475/293 |
| 2014/0338940 | A1 * | 11/2014 | Kelleher | B25D 17/20 173/48 |
| 2015/0135872 | A1 | 5/2015 | Wang | |
| 2017/0182648 | A1 | 6/2017 | Mao | |
| 2017/0355072 | A1 | 12/2017 | Mao | |
| 2019/0160636 | A1 * | 5/2019 | Hirabayashi | B25D 16/006 |
| 2020/0147776 | A1 * | 5/2020 | Kamiya | B25B 23/18 |
| 2020/0238483 | A1 | 7/2020 | Kamiya | |
| 2021/0107128 | A1 * | 4/2021 | Lu | B25D 17/24 |
| 2021/0170564 | A1 * | 6/2021 | Gehret | B23B 45/00 |

FOREIGN PATENT DOCUMENTS

| | | | |
|---|---|---|---|
| CN | 203611221 | U | 5/2014 |
| CN | 104669215 | A | 6/2015 |
| CN | 204621991 | U | 9/2015 |
| CN | 106239433 | A | 12/2016 |
| CN | 205852701 | U | 1/2017 |
| CN | 104874834 | A | 6/2018 |
| CN | 106914847 | A | 3/2019 |
| CN | 209511022 | U | 10/2019 |
| CN | 107283368 | A | 9/2021 |
| CN | 111482932 | A | 8/2023 |
| EP | 2508303 | B1 | 2/2016 |

* cited by examiner

IMPACT DRILL

RELATED APPLICATION INFORMATION

This application claims the benefit under 35 U.S.C. § 119(a) of Chinese Patent Application No. CN 202110760686.4, filed on Jul. 6, 2021, and Chinese Patent Application No. CN 202110760706.8, filed on Jul. 6, 2021, which applications are incorporated herein by reference in their entirety.

BACKGROUND

An impact drill is configured to provide torque to assist a user in daily operation and has a torque adjustment device for adjusting the output torque of the impact drill. The torque adjustment device in the existing product has a complex structure and a large size, not facilitating a reduction in the size of the impact drill. Moreover, the existing torque adjustment structure is relatively unreliable and thus is prone to a malfunction of torque adjustment.

SUMMARY

An impact drill includes a motor, a housing assembly, an output shaft, a transmission assembly, a lock pin, a biasing element, a function conversion member and an operation member. The housing assembly is configured to support the motor. The output shaft is configured to be driven by the motor to rotate around a first axis. The transmission assembly includes a locking ring rotatable relative to the housing assembly. The lock pin is connected to the locking ring and configured to stop the rotation of the locking ring. The biasing element is configured to bias the lock pin such that the lock pin applies a locking force to stop the rotation of the locking ring. The function conversion member is configured to be stopped from moving along the first axis by a stop structure. The function conversion member includes a stop portion configured to stop the movement of the lock pin along the first axis and a release portion configured to allow the movement of the lock pin along the first axis. The operation member is configured to drive the function conversion member to switch a stop state of the movement of the lock pin along the first axis.

In some examples, the transmission assembly further includes a planet gear set and a gearbox. The planet gear set includes a planet gear, a sun gear and a planet carrier. The planet gear is mounted on the planet carrier. The planet gear meshes with the sun gear. Moreover, the locking ring includes meshing teeth meshing with the planet gear and locking teeth abutting the lock pin.

In some examples, the stop structure engages with the function conversion member along a direction perpendicular to the first axis.

In some examples, the front end of the lock pin forms a first step portion and a second step portion. The first step portion is capable of abutting the stop portion. Moreover, the second step portion is located at the side end of the function conversion member.

In some examples, the function conversion member is an annular structure. The middle portion of the function conversion member forms an opening for the lock pin to pass through. Moreover, the stop portion protrudes toward the center of the opening relative to the release portion.

In some examples, the impact drill includes an impact assembly. The impact assembly includes a fixed impact mechanism and a dynamic impact mechanism. At least part of the fixed impact mechanism is securely connected to the housing assembly. The dynamic impact mechanism is movable with the output shaft along the first axis. The operation member is connected to the dynamic impact mechanism. Moreover, the operation member has a first state in which the movement of the dynamic impact mechanism along the axial direction of the first axis is allowed and a second state in which the movement of the dynamic impact mechanism along the axial direction of the first axis is stopped.

In some examples, the dynamic impact mechanism forms a leg. The fixed impact mechanism is provided with a mating portion. Moreover, the dynamic impact mechanism is configured to be driven by the operation member to rotate around the first axis such that the mating portion and the leg are aligned or staggered along the axial direction of the first axis.

In some examples, the mating portion is a boss or groove formed on the fixed impact mechanism.

In some examples, the impact assembly further includes a bushing sleeved on the outer side of the dynamic impact mechanism. The dynamic impact mechanism forms a leg. The dynamic impact mechanism is configured to be driven by the operation member to rotate around the first axis. Moreover, the bushing forms a groove configured to mate with the leg.

In some examples, a plurality of lock pins are provided.

In some examples, the impact drill further includes an annular gasket. The annular gasket is connected to the plurality of lock pins.

In some examples, the biasing element is connected to the annular gasket.

In some examples, the operation member is a rotary drum sleeved on the housing assembly. The operation member is operable to move around the first axis to switch the state of the operation member and the position of the function conversion member.

In some examples, the function conversion member is configured to be driven by the operation member to rotate around the first axis.

In some examples, when the stop portion abuts the lock pin, the impact drill is switched to a hammer shift mode or a drill shift mode. Moreover, when the lock pin is aligned with the release portion along the first axis, the impact drill is switched to a screw shift mode.

An impact drill includes a motor, a housing assembly, an output shaft, a transmission assembly, a lock pin and a function conversion member. The housing assembly is configured to support the motor. The output shaft is configured to be driven by the motor to rotate around a first axis. The transmission assembly includes a locking ring rotatable relative to the housing assembly. The lock pin is connected to the locking ring and configured to stop the rotation of the locking ring. The function conversion member is selectively connected to the lock pin. The function conversion member includes a first position and a second position. When the function conversion member is in the first position, the function conversion member is connected to the lock pin, and the movement of the lock pin relative to the housing assembly along the first axis is stopped. Moreover, when the function conversion member is in the second position, the lock pin is capable of reciprocating relative to the housing assembly along the first axis.

An impact drill includes a motor, a housing assembly, an output shaft, a transmission assembly, a plurality of lock pins, an annular gasket, a biasing element and a function conversion member. The housing assembly is configured to support the motor. The output shaft is configured to be driven by the motor to rotate around a first axis. The transmission assembly includes a locking ring rotatable relative to the housing assembly. The plurality of lock pins are connected to the locking ring and configured to stop the rotation of the locking ring. The annular gasket is connected to the plurality of lock pins. The biasing element is connected to the annular gasket and configured to make the plurality of lock pins apply a locking force to stop the rotation of the locking ring. The function conversion member is selectively connected to the plurality of lock pins. The function conversion member includes a first position and a second position. When the function conversion member is in the first position, the function conversion member is connected to the plurality of lock pins, and movement of the plurality of lock pins relative to the housing assembly along the first axis is stopped. Moreover, when the function conversion member is in the second position, the plurality of lock pins are capable of reciprocating relative to the housing assembly along the first axis.

In some examples, the function conversion member includes a stop portion configured to stop the movement of the plurality of lock pins along the first axis and a release portion configured to allow the movement of the plurality of lock pins along the first axis. When the function conversion member is in the first position, the stop portion abuts the plurality of lock pins. Moreover, when the function conversion member is in the second position, the plurality of lock pins are aligned with the release portion along the first axis.

In some examples, the impact drill includes an operation member. The operation member is configured to stop the movement of the function conversion member along the first axis and configured to drive the function conversion member to switch between the first position and the second position.

In some examples, the impact drill further includes an impact assembly. The impact assembly includes a fixed impact mechanism and a dynamic impact mechanism. At least part of the fixed impact mechanism is securely connected to the housing assembly. The dynamic impact mechanism is movable with the output shaft along the first axis. The operation member is connected to the dynamic impact mechanism. Moreover, the operation member has a first state in which the movement of the dynamic impact mechanism along the axial direction of the first axis is allowed and a second state in which the movement of the dynamic impact mechanism along the axial direction of the first axis is stopped.

DETAILED DESCRIPTION

The present application is described below in detail in conjunction with drawings and examples.

Figure 1:
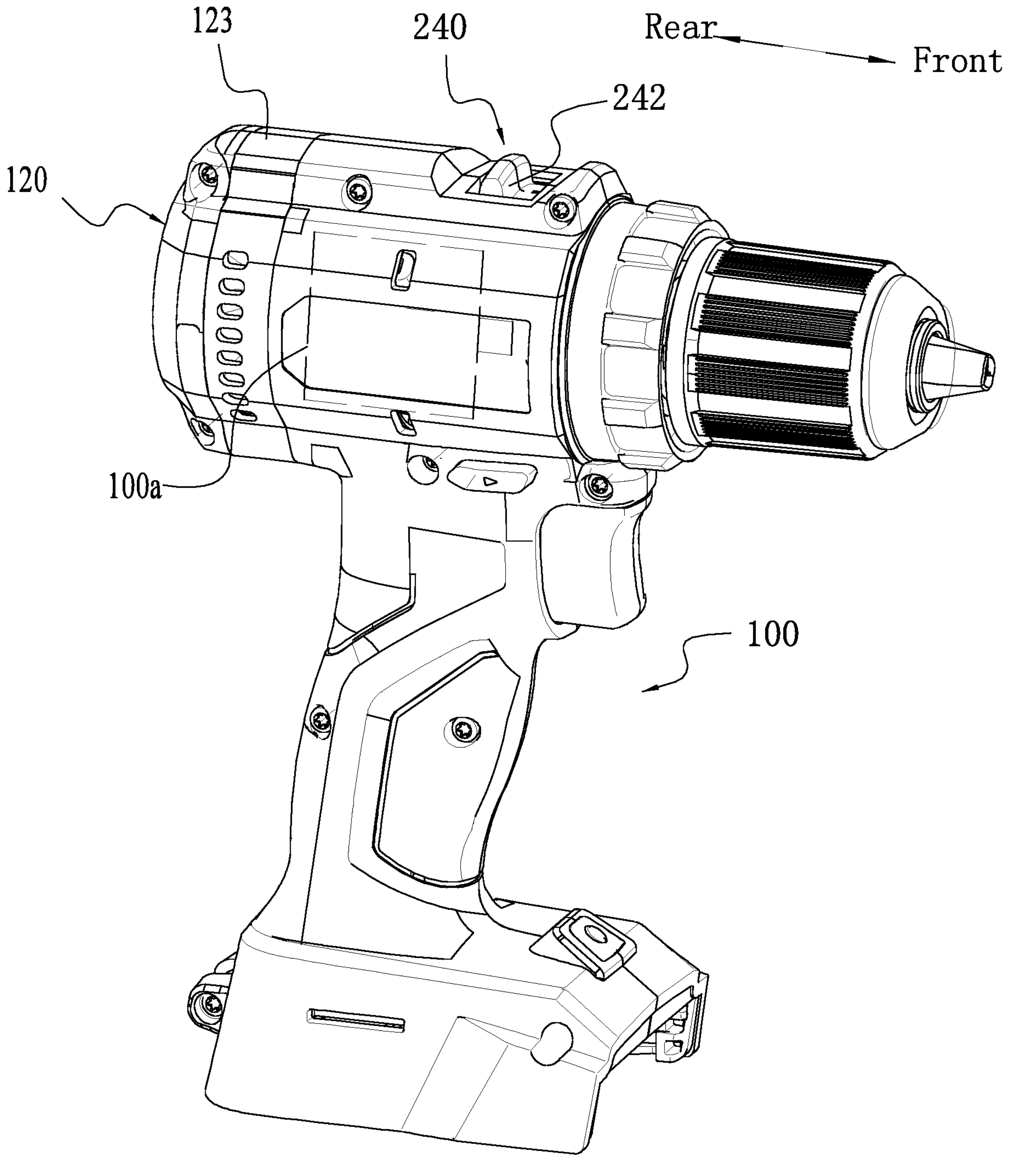
FIG. 1 is a perspective view illustrating the structure of an impact drill according to a first example of the present application.

Referring to FIG. 1, the present application provides an impact drill 100. The impact drill 100 can provide at least torque to assist a screw to penetrate into a workpiece and impact force for impact work. The impact function of the impact drill 100 can be operated to turn on or off so that the impact drill 100 can switch between the screw shift mode, the hammer shift mode and the drill shift mode to meet the needs of different working conditions of a user.

Figure 2:
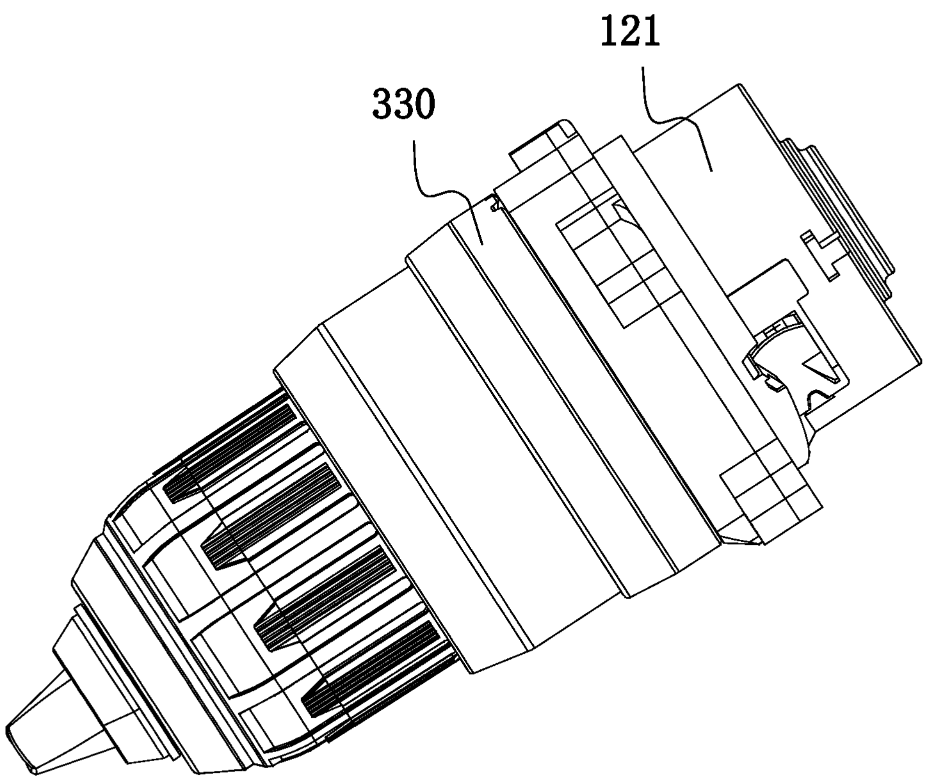
FIG. 2 is a view illustrating the structure of a transmission assembly 200 and an impact assembly of the impact drill of FIG. 1.
Figure 3:
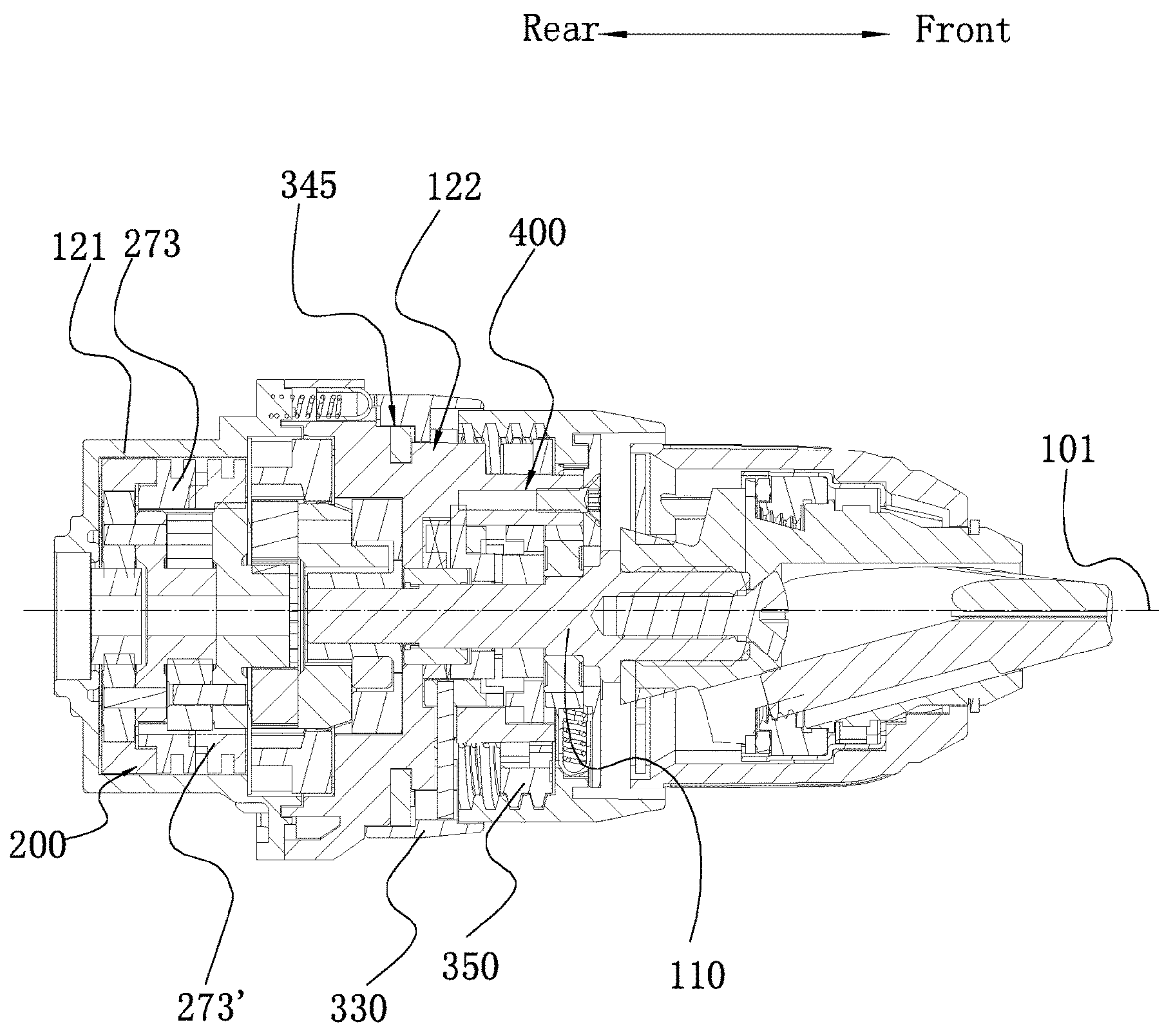
FIG. 3 is a sectional view of FIG. 2.
Figure 4:
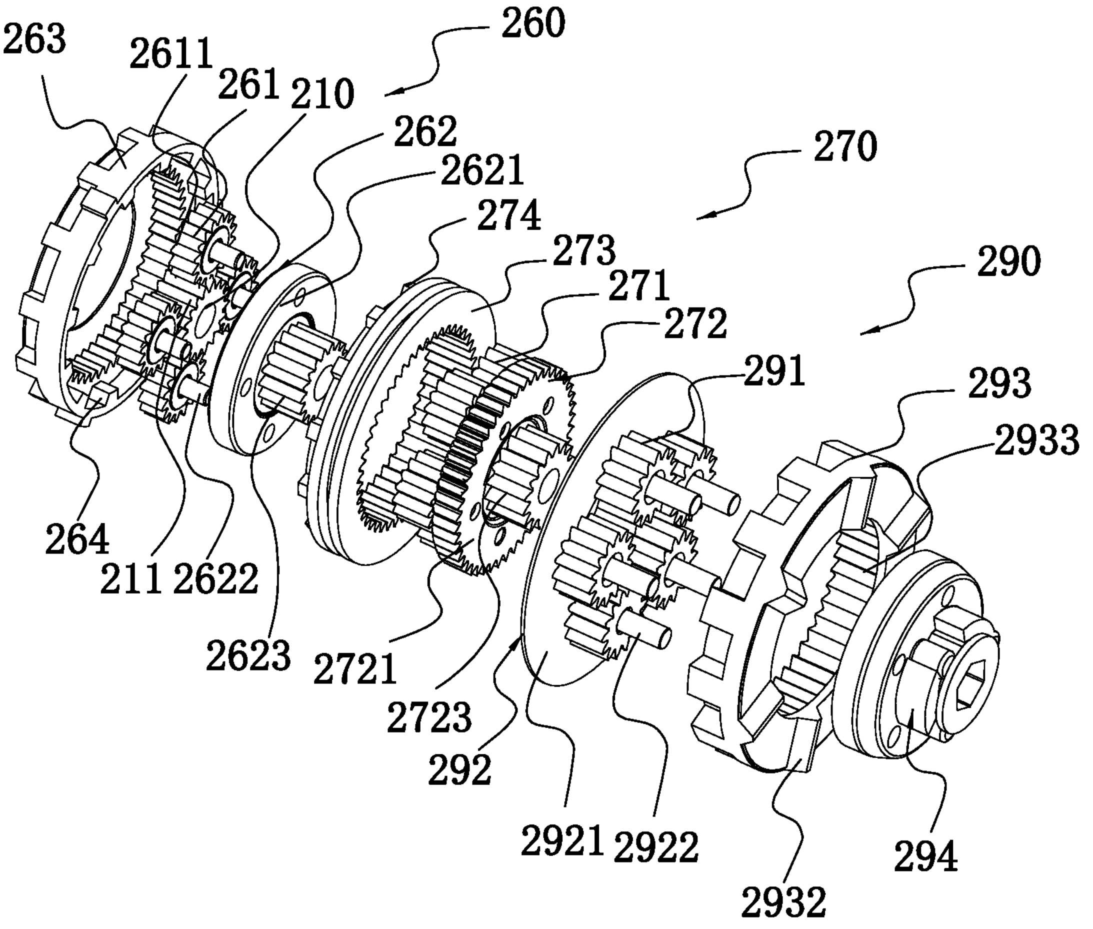
FIG. 4 is an exploded view of the transmission assembly 200 of the impact drill of FIG. 2.
Figure 5:
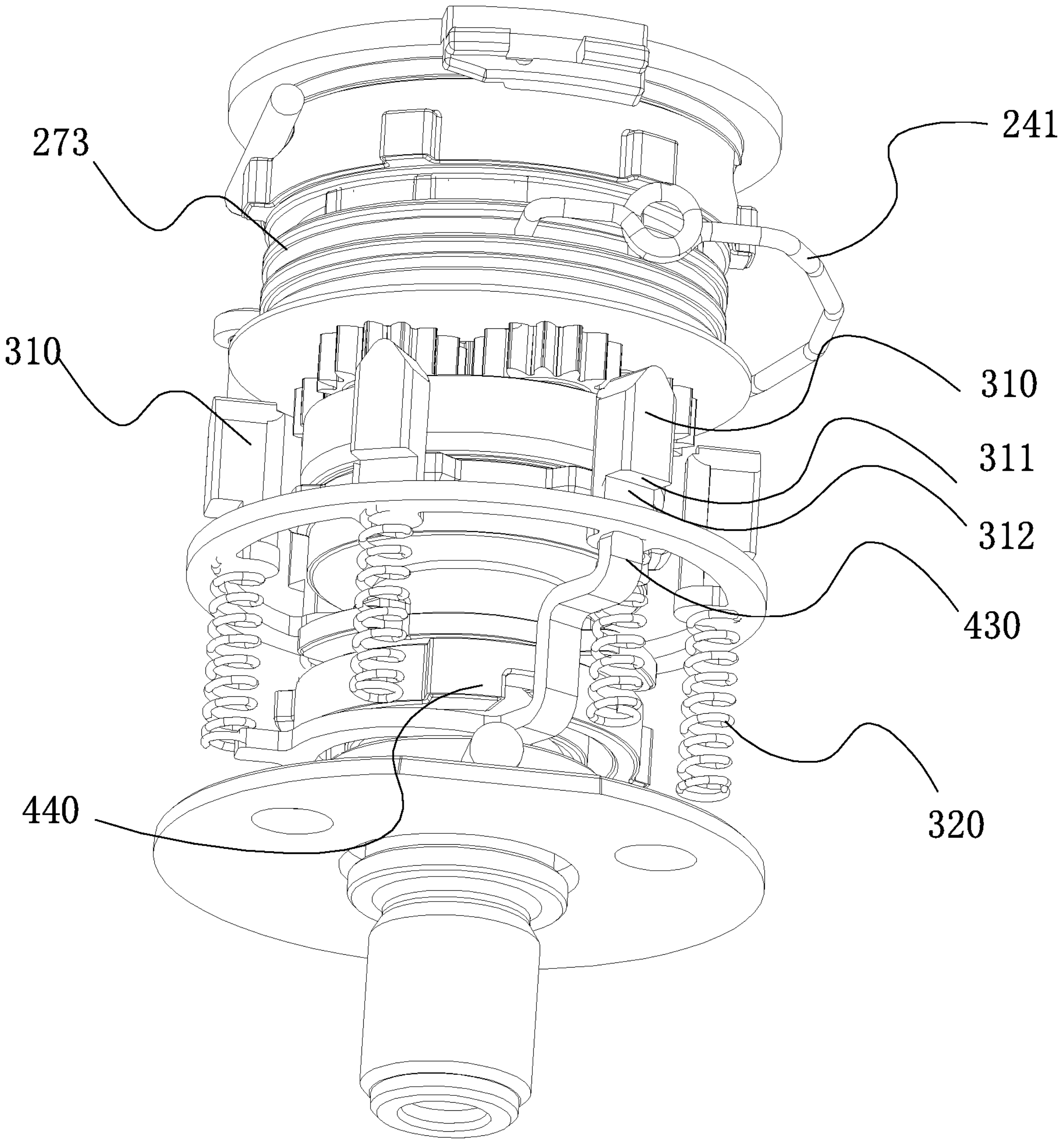
FIG. 5 is a view illustrating the structure of an impact assembly of the impact drill of FIG. 1, where an operation member of the impact drill is in a first state and a third-stage ring gear and a torque adjustment ring are removed from the impact drill.

Referring to FIGS. 1 to 3, the impact drill 100 includes a motor **100*a*, a housing assembly 120, an output shaft 110 and an impact mechanism 400. The motor 100*a* is disposed in the housing assembly 120 and supported by the housing assembly 120. The output shaft 110 is configured to be driven by the motor 100*a* to rotate around a first axis 101. The end of the output shaft 110 is provided with a working head so that the output shaft 110 can drive the workpiece to rotate to implement the screwdriver function. The impact mechanism 400 can drive the output shaft 110 to perform impact action along the first axis 101 so that the impact drill 100 implements the function of an impact drill. An operation member 330 is connected to the impact mechanism 400. The impact function of the impact drill 100 is turned on and off through the operation member 330**.

The motor **100*a* has a motor 100*a* shaft which rotates along the first axis 101. The impact drill 100 further includes a transmission assembly 200. The transmission assembly 200 connects the motor 100*a* shaft and the output shaft 110. The motor 100*a* through the transmission assembly 200 drives the output shaft 110** to rotate.

Referring to FIGS. 1 to 5, the housing assembly 120 includes a gearbox 121, a front end housing 122 and a main housing 123. The transmission assembly 200 is disposed in the gearbox 121. The impact mechanism 400 is disposed in the front end housing 122. The main housing 123 supports the gearbox 121, the front end housing 122, and the motor **100*a***.

The transmission assembly 200 includes a first planet gear set 260, a second planet gear set 270 and a third planet gear set 290. The second planet gear set 270 is disposed between the first planet gear set 260 and the third planet gear set 290. The first planet gear set 260 includes a first planet gear 261 and a first planet carrier 262. The second planet gear set 270 includes a second planet gear 271 and a second planet carrier 272. The transmission assembly 200 includes a sun gear 210. The sun gear 210 is connected to the motor **100*a* shaft and is driven by the motor 100***a* to rotate. The first planet gear 261 is configured to mesh with the sun gear 210.

The transmission assembly 200 further includes a first-stage ring gear 263 disposed in the gearbox. The first-stage ring gear 263 meshes with the first planet gear 261. Multiple first planet gears 261 are provided. The multiple first planet gears 261 are configured to mesh with the sun gear 210. The motor 100*a* through the sun gear 210 drives the first planet gear 261 to rotate. The sun gear 210 and the first planet gear 261 form meshing teeth which transmit power. The apex circle diameter of the meshing teeth 211 of the sun gear is set to be smaller than the apex circle diameter of the meshing teeth 2611 of the first planet gear. Thus, the number of teeth of the meshing teeth 2611 of the first planet gear is greater than the number of teeth of the meshing teeth 211 of the sun gear.

The first planet carrier 262 includes a first transmission plate 2621, a first support frame 2622 and a first output portion 2623. The first support frame 2622 and the first output portion 2623 are formed on two sides of the first transmission plate 2621 respectively. The first support frame 2622 is inserted into the first planet gear 261 and rotatably connected to the first planet gear 261. Thus, the first planet gear 261 can drive the first planet carrier 262 to rotate around the first axis 101 during operation. Meshing teeth are formed on the peripheral side of the first output portion 2623. The first output portion 2623 is configured to mesh with the second planet gear set 270, thereby implementing the transmission connection of the first planet gear set 260 and the second planet gear set 270.

Multiple second planet gears 271 are provided. The multiple second planet gears 271 externally mesh with the first output portion 2623. That is, the first output portion 2623 of the first planet gear set forms the sun gear of the second planet gear 271. The transmission assembly 200 further includes a second-stage ring gear 273. Internal teeth are formed on the inner circumference of the second-stage ring gear 273. The second-stage ring gear 273 meshes with the second planet gear 271. The second planet gear 271 is rotatably connected to the second planet carrier 272. The second planet carrier 272 includes a second transmission plate 2721, a second support frame and a second output portion 2723. The second support frame and the second output portion 2723 are formed on two sides of the second transmission plate 2721 respectively. The second support frame is inserted into the second planet gear 271 and rotatably connected to the second planet gear 271 so that the second planet gear 271 can drive the second planet carrier 272 to rotate around the first axis 101 during operation. Meshing teeth are formed on the peripheral side of the second transmission plate 2721 and the second output portion 2723.

The second-stage ring gear 273 meshes with the second planet gear 271. The second-stage ring gear 273 includes multiple first locking teeth 274. The first-stage ring gear 263 is provided with second locking teeth 264 mating with the first locking teeth 274. The second locking teeth 264 and the first locking teeth 274 are staggered along a circumferential direction of the first axis 101. When the second locking teeth 264 are connected to the first locking teeth 274, the second locking teeth 264 stop the rotation of the first locking teeth 274 relative to the second locking teeth 264. Specifically, when the second locking teeth 264 are connected to the first locking teeth 274, the second-stage ring gear 273 and the first-stage ring gear 263 are fixed in the gearbox 121.

The third planet gear set 290 includes a third planet gear 291, a drive gear 292, a third-stage ring gear 293 and a shaft lock mechanism 294. The third-stage ring gear 293 meshes with the third planet gear 291. The drive gear 292 is used to mount the third planet wheel 291. The drive gear 292 includes a third transmission plate 2921 and a third support frame 2922. The third support frame 2922 is formed on one side of the third transmission plate 2921. The second planet gear set 270 is located on another side of the third transmission plate 2921. The second output portion 2723 meshes with the third planet gear 291 through the third transmission plate 2921. The third support frame 2922 is inserted into the third planet wheel 291 and rotatably connected to the third planet wheel 291 so that the third planet wheel 291 can drive the drive gear 292 to rotate around the first axis 101 during operation. The third support frame 2922 is inserted into the shaft lock mechanism 294. Moreover, the shaft lock mechanism 294 is connected to the output shaft. The output shaft 110 includes a flat position mating with the shaft lock mechanism 294. A portion of the output shaft 110 is disposed in the shaft lock mechanism 294 so that the output shaft 110 and the drive gear 292 can rotate synchronously.

The transmission assembly 200 further includes a switching member 240. The switching member 240 includes a swing frame 241 and a switching knob 242 disposed on the housing assembly 120. The switching knob 242 is used for a user to operate. The swing frame 241 can be moved to at least a first speed change position and a second speed change position. When the swing frame 241 switches between the first speed change position and the second speed change position, the second-stage ring gear 273 moves along the axial direction of the first axis 101. Specifically, the second-stage ring gear 273 moves back and forth along the axial direction of the first axis 101. As shown in FIG. 3, the second-stage ring gear 273 is the position of the second-stage ring gear when the swing frame 241 is in the first speed change position. Moreover, the second-stage ring gear 273' is the position of the second-stage ring gear when the swing frame 241 is in the second speed change position.

When the swing frame 241 is in the first speed change position, the second locking teeth 264 and the first locking teeth 274 are staggered along the circumferential direction of the first axis 101. Specifically, the second locking teeth 264 are connected to the first locking teeth 274. When the swing frame 241 is in the second speed change position, the second locking teeth 264 and the first locking teeth 274 are disengaged along the circumferential direction of the first axis 101. When the swing frame 241 is in the first speed change position, the second locking teeth 264 abuts the first locking teeth 274 to stop the rotation of the second-stage ring gear 273. That is, the second-stage ring gear 273 is non-rotatable relative to the gearbox 121 around the first axis 101. At this time, a second-stage planet gear set plays a role in deceleration. Moreover, the transmission assembly 200 overall outputs a first transmission ratio. When the swing frame 241 is moved to the second speed change position, the second locking teeth 264 are no longer abut the first locking teeth 274. Thus, the second-stage ring gear 273' can rotate relative to the gearbox 121 so that the second-stage ring gear 273' and the second planet gear 271 rotate synchronously. The second-stage planet gear set 270 has no deceleration effect. At this time, the transmission assembly 200 overall outputs a second transmission ratio. The first transmission ratio is greater than the second transmission ratio.

In other examples, the second locking teeth may be disposed on the gearbox or other non-rotatable components relative to the housing assembly 120. The component forming the second locking teeth is limited to non-rotatable relative to the housing assembly 120 and selectively connected to the first locking teeth. Moreover, when connected to the first locking teeth, the component can stop the first locking teeth from rotating around the first axis 101.

Referring to the figures and specifically to FIGS. 5-10, the impact drill 100 further includes lock pins 310 and a biasing element 320. The lock pins 310 are connected to a locking ring. In this example, the third-stage ring gear 293 is a locking ring. The third-stage ring gear 293, that is, the locking ring, includes meshing teeth 2933 forming the ring gear for meshing with planet gears and locking teeth 2932 abutting the lock pins 310. One end of the biasing element 320 is connected to the lock pins 310. Moreover, another end of the biasing element 320 is connected to a torque adjustment ring 350. The biasing element 320 provides a biasing force which causes the lock pins 310 to press against the locking ring. By rotating the torque adjustment ring 350, the distance between the torque adjustment ring 350 and the locking ring increases or decreases.

The impact drill 100 further includes a function conversion member 340. The function conversion member 340 includes a stop portion 341 configured to stop the movement of the lock pins 310 along the first axis 101 and a release portion 342 configured to allow the movement of the lock pins 310 along the first axis 101. The operation member 330 is connected to the function conversion member 340. The operation member 330 is configured to drive the function conversion member 340 to rotate around the first axis 101 to switch the stop state of the movement of the lock pins 310 along the first axis 101. The operation member 330 is a rotary drum sleeved on the housing assembly 120. The operation member 330 can be operated to move around the first axis. The operation member 330 is provided with a boss or a groove along the direction perpendicular to the first axis. That is, the inner sidewall of the operation member 330 is provided with a boss or a groove toward the center of the circle. The function conversion member 340 is provided with a groove or a boss mating with the boss or groove of the operation member 330, and this forms a stop structure 345 configured to stop the movement of the function conversion member 340 along the first axis 101. The operation member 330 rotates around the first axis to drive the function conversion member 340 to rotate around the first axis, thereby switching the position of the function conversion member 340.

Figure 6:
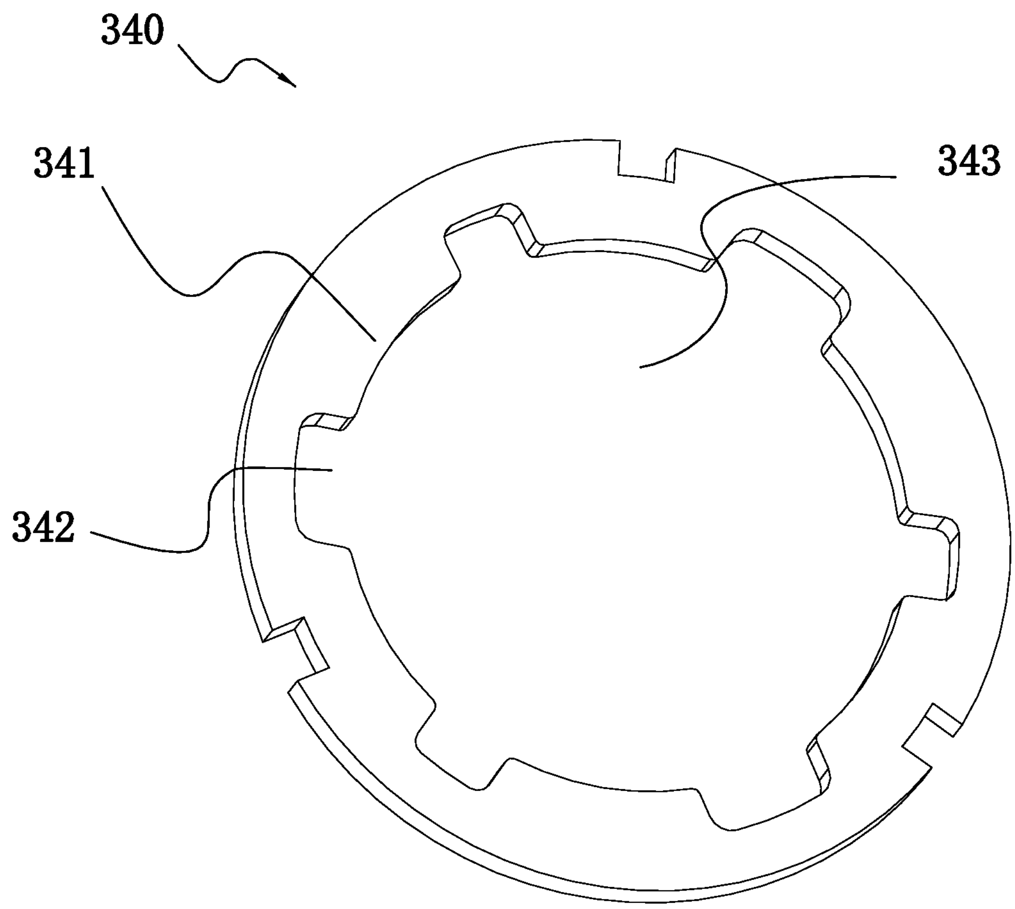
FIG. 6 is a view illustrating the structure of a function conversion member of the impact drill of FIG. 1.
Figure 7:
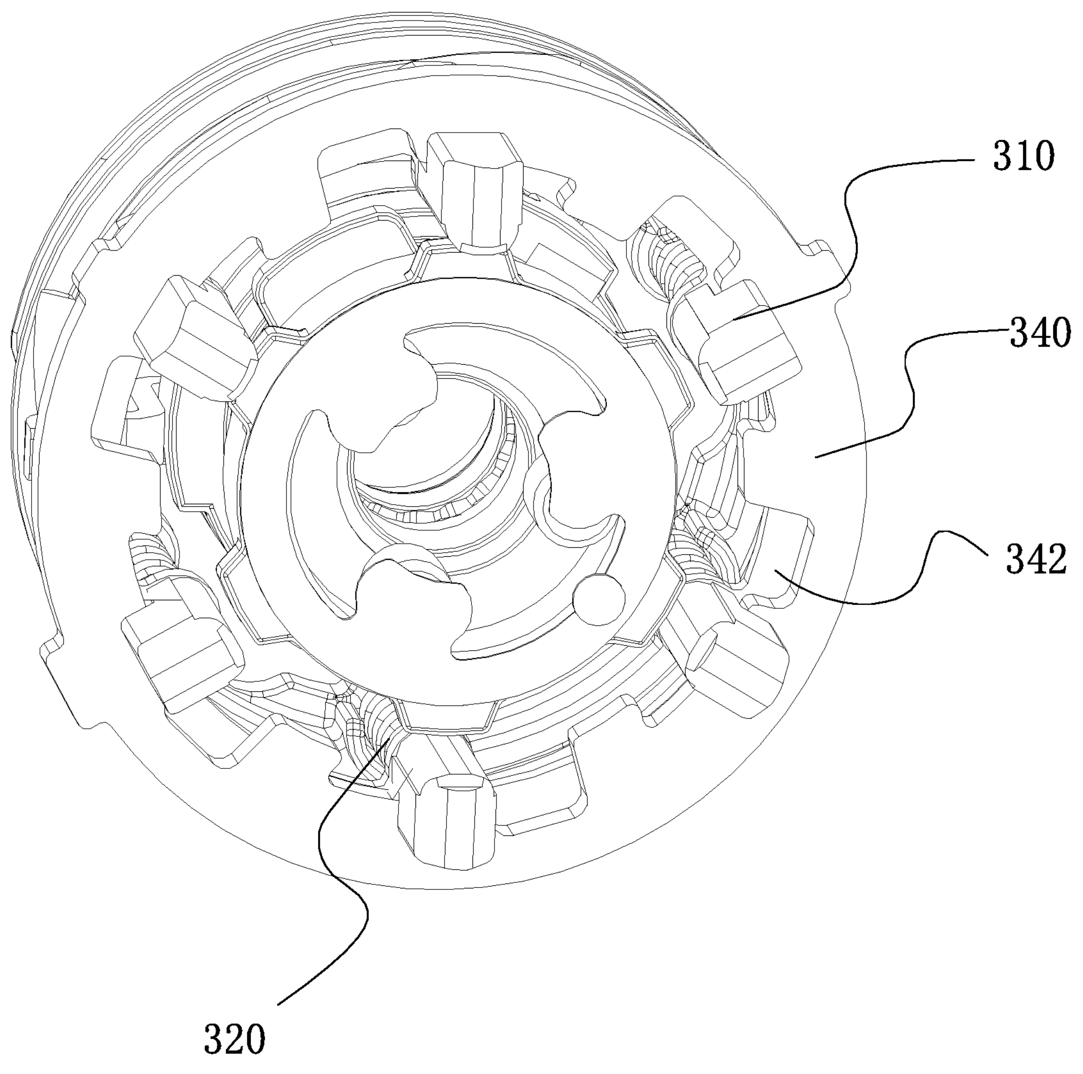
FIG. 7 is a view illustrating the structure of a function conversion member of the impact drill of FIG. 1, where the function conversion member is in a first position.
Figure 8:
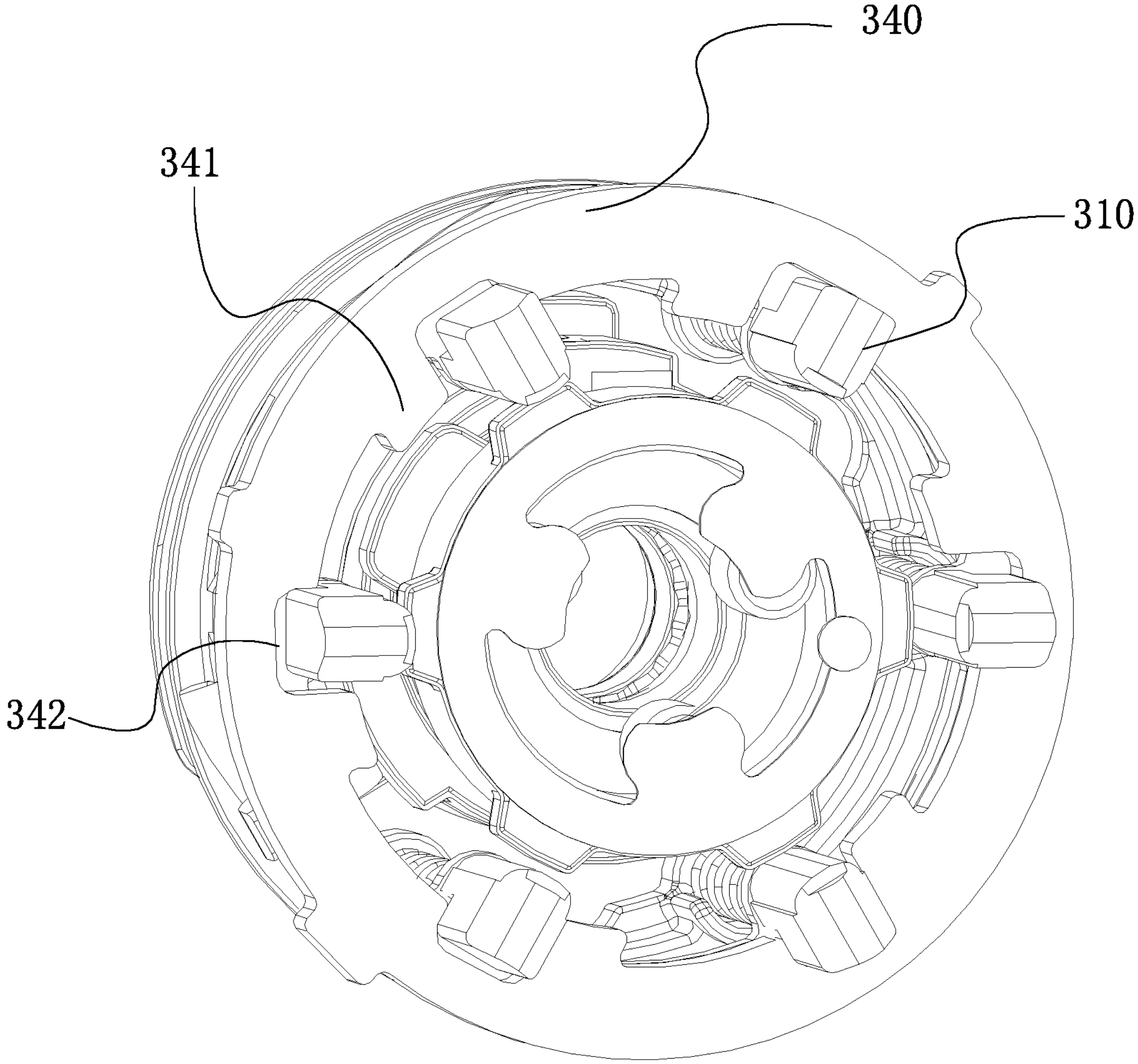
FIG. 8 is a view illustrating the structure of a function conversion member of the impact drill of FIG. 1, where the function conversion member is in a second position.
Figure 9:
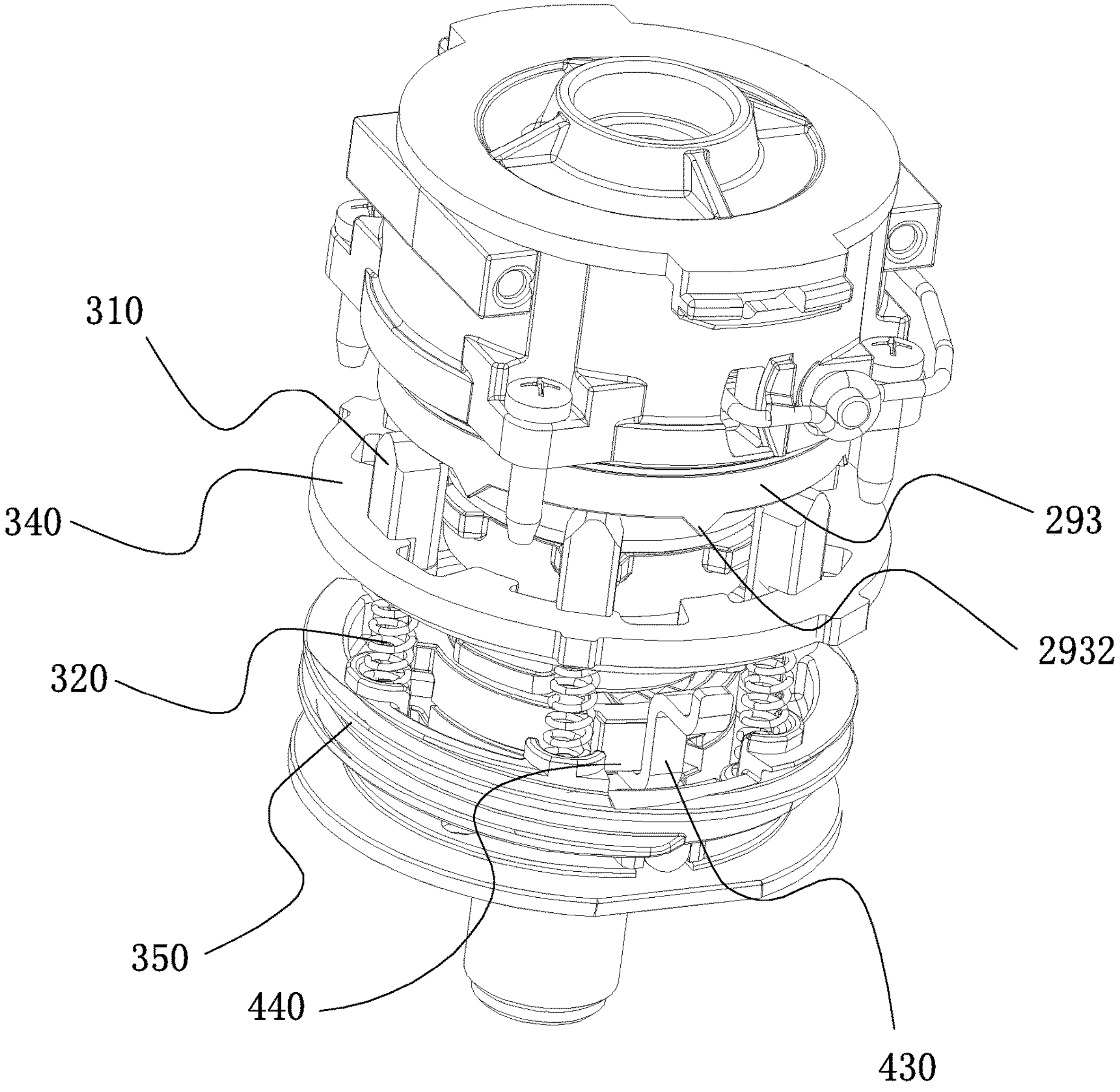
FIG. 9 is a view illustrating the structure of an impact assembly of the impact drill of FIG. 1, where an operation member of the impact drill is in a second state.

As shown in FIG. 6, the function conversion member 340 is a gasket. The middle portion of the gasket forms an opening 343 for the lock pins 310 and the transmission assembly 200 to pass through. The stop portion 341 protrudes toward the center of the opening 343 relative to the release portion 342. The function conversion member 340 can rotate relative to the housing assembly 120 around the first axis 101 so that the stop portion 341 and the release portion 342 are separately aligned or staggered with the lock pins 310 along the axial direction of the first axis 101. Specifically, the lock pins 310 include a first step portion 311 and a second step portion 312. The first step portion 311 is capable of abutting the stop portion 341. Moreover, the second step portion 312 is located at the side end of the function conversion member 340. In this example, when the stop portion 341 and the lock pins 310 are aligned along the axial direction of the first axis 101, and the stop portion 341 of the function conversion member 340 abuts the first step portion 311 of the lock pins 310, the movement of the lock pins 310 compressing the biasing element 320 along the axial direction of the first axis 101 is stopped. The biasing element 320 is an elastic member which can be compressed. When the release portion 342 and the lock pins 310 are aligned along the axial direction of the first axis 101, the lock pins 310 can pass through the release portion 342. At this time, the lock pins 310 can compress the biasing element 320 along the axial direction of the first axis 101. The structure of the function conversion member 340 is simple, and thus the overall size of the gearbox 121 can be reduced.

The function conversion member 340 includes a first position and a second position. When the operation member 330 rotationally drives the function conversion member 340 to rotate to the second position, and the lock pins 310 are aligned with the release portion 342 in the first axis 101, a user adjusts the biasing force provided by the biasing element 320 for the lock pins 310 by adjusting the amount of compression of the biasing element 320 by rotating the torque adjustment ring 350. The lock pins 310 are subjected to the rotary torque of the locking teeth 2732 and the biasing force of the biasing element 320. At this time, if the pressure generated by the rotary torque of the locking teeth 2732 to which the lock pins 310 are subjected cannot exceed the biasing force of the biasing element 320, the lock pins 310 will drive the third-stage ring gear 293 to stop rotating. Moreover, the drive gear 292 can output power to the output shaft 110. At this time, if the pressure of the locking teeth 2732 to which the lock pins 310 are subjected can exceed the biasing force of the biasing element 320, the lock pins 310 will move along the axial direction and cross the locking teeth 2732. Moreover, the drive gear 292 cannot output power through the output shaft 110. Torque adjustment of the torque output tool is implemented by adjusting the biasing force of the biasing element 320.

When the operation member 330 rotationally drives the function conversion member 340 to rotate to the first position, the lock pins 310 are aligned with the stop portion 341 in the first axis 101. In this example, the stop portion 341 of the function conversion member 340 abuts the first step portion of the lock pins 310. The lock pins 310 are locked by the function conversion member 340 so that the impact drill 100 outputs power with maximum torque.

Referring to FIGS. 5 to 10, the impact mechanism 400 includes a fixed impact mechanism 410 and a dynamic impact mechanism 420. The fixed impact mechanism 410 is securely connected to the housing assembly 120. The fixed impact mechanism 410 is sleeved on the output shaft 110 and stops the output shaft 110 along the radial direction of the first axis 101. The dynamic impact mechanism 420 is movable with the output shaft 110 along the first axis 101. The operation member 330 is connected to the dynamic impact mechanism 420. Moreover, the operation member 330 includes a first state in which the movement of the dynamic impact mechanism 420 along the axial direction of the first axis 101 is allowed and a second state in which the movement of the dynamic impact mechanism 420 along the axial direction of the first axis 101 is stopped, thereby implementing the impact function of turning on or off the impact drill 100. In this example, a user can implement the impact function of turning on or off the impact drill 100 by rotating the operation member 330 around the first axis 101.

The fixed impact mechanism 410 includes fixed impact teeth 411. The fixed impact teeth 411 are connected to the housing assembly 120. The dynamic impact mechanism 420 includes dynamic impact teeth 421. The dynamic impact teeth 421 can move along the first axis 101 with the output shaft 110. The fixed impact teeth 411 are in clearance fit with the output shaft 110. In this example, the fixed impact teeth 411 are in small clearance fit with the output shaft 110. Moreover, the output shaft 110 can rotate relative to the fixed impact teeth 411 around the first axis 101 and reciprocate along the axial direction of the first axis 101.

The impact mechanism further includes a leg 430. In this example, the dynamic impact mechanism 420 forms the leg 430. A mating portion 440 is formed on the fixed impact mechanism 410. The dynamic impact mechanism 420 is configured to be driven by the operation member 330 to rotate around the first axis 101 so that the mating portion 440 and the leg 430 are aligned or staggered along the axial direction of the first axis 101. The mating portion 440 is a boss or groove formed on the fixed impact mechanism 410.

When the operation member 330 drives the function conversion member 340 to rotate to the first position, the operation member 330 can be switched to the first state to make the impact drill 100 switch to the hammer shift mode, or the operation member 330 can be switched to the second state to make the impact drill 100 switch to the drill shift mode. When the operation member 330 drives the function conversion member 340 to rotate to the second position, the operation member 330 can be switched to the second state to make the impact drill 100 switch to the screw shift mode. Therefore, a user can adjust the function of the impact drill 100 by rotating the operation member 330. The impact drill 100 can be adjusted to the drill shift mode, the screw shift mode or the hammer shift mode successively.

When the operation member 330 drives the function conversion member 340 to rotate to the first position, the operation member 330 can be switched to the first state, and the impact drill 100 is switched to the hammer position. In this example, the operation member 330 drives the function conversion member 340 to rotate to the first position, and the operation member 330 is driven and the leg 430 is rotated to make the operation member in the first state. Specifically, the stop portion 341 abuts the first step portion of the lock pins 310, and the leg 430 is aligned with the groove of the mating portion 440. Alternatively, the leg 430 and the boss of the mating portion 440 are staggered so that the dynamic impact mechanism 420 can move relative to the housing assembly 120 along the axial direction of the first axis 101, and so that the output shaft 110 can impact along the first axis 101. The operation member 330 is operated to rotate to drive the function conversion member 340 to rotate to the first position. Moreover, the operation member 330 can be switched to the second state, and the impact drill 100 is switched to the drill shift mode. In this example, the operation member 330 drives the function conversion member 340 to rotate to the first position. Moreover, the operation member 330 is driven and the leg 430 is rotated to make the operation member in the second state. Specifically, the stop portion 341 abuts the first step portion of the lock pins 310, and the leg 430 and the groove of the mating portion 440 are staggered. Alternatively, the leg 430 abuts the boss of the mating portion 440 so that the impact drill 100 outputs the rotation with the maximum torque without generating the impact motion. The operation member 330 is operated to rotate to drive the function conversion member 340 to rotate to the second position. At this time, the operation member 330 can be switched to the second state, and the impact drill 100 is switched to the screw shift mode. In this example, the operation member 330 drives the function conversion member 340 to rotate to the second position. Moreover, the operation member 330 is driven and the leg 430 is rotated to make the operation member in the second state. Specifically, the stop portion 341 and the lock pins 310 are staggered, the lock pins 310 can pass through the release portion 342, and the leg 430 and the groove of the mating portion 440 are staggered, or the leg 430 and the boss of the mating portion 440 are aligned. Thus, the output shaft 110 does not make an impact motion, and the impact drill 100 has a function of adjusting torque.

Figure 10:
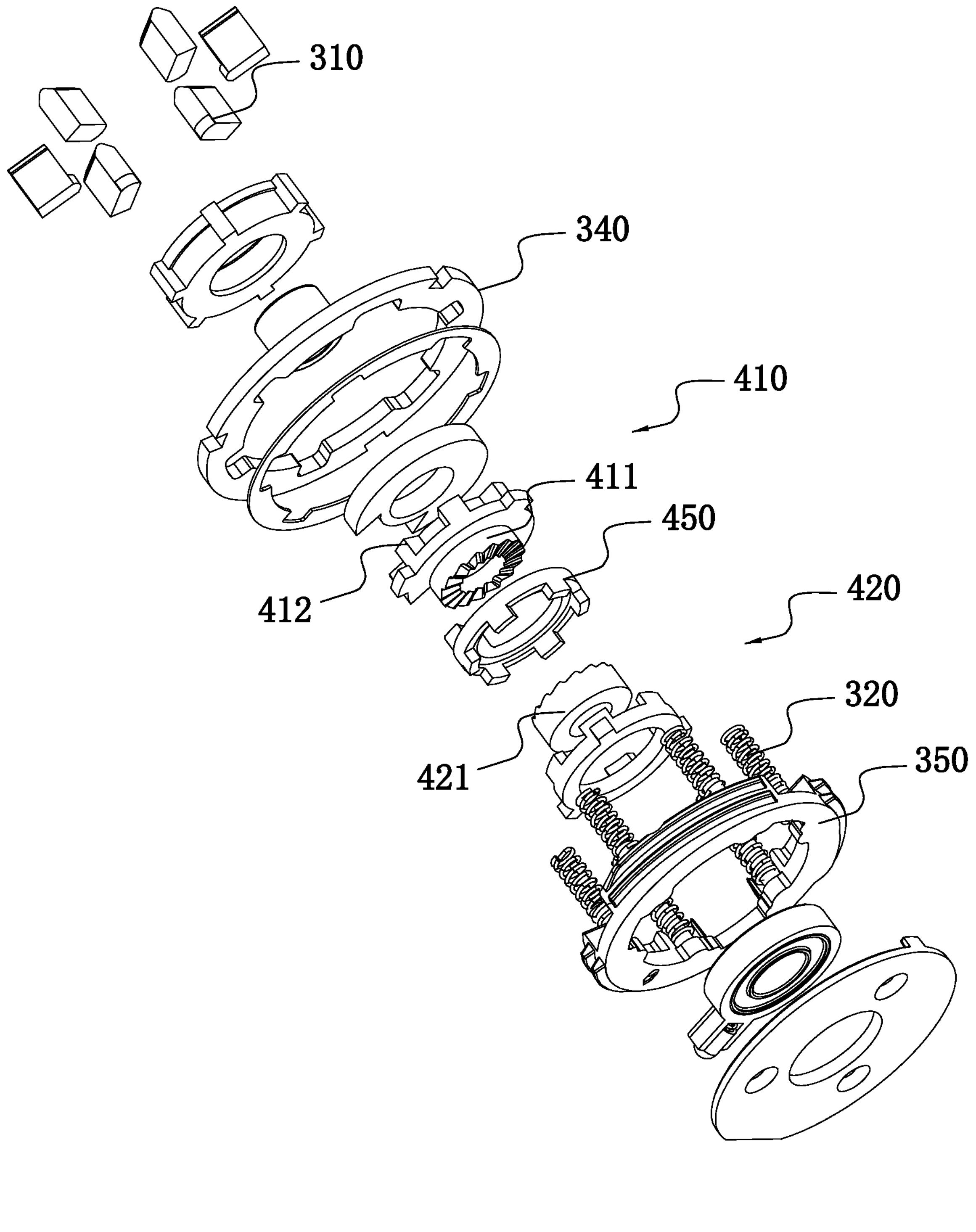
FIG. 10 is an exploded view of the impact assembly of the impact drill of FIG. 9.

As an alternative example, with reference to FIG. 10, the impact assembly 400 further includes a bushing 450. The bushing 450 is sleeved on the outer side of the dynamic impact mechanism 420. The dynamic impact mechanism forms the leg 430. The bushing 450 is configured to be driven by the operation member 330 to rotate around the first axis 101. The bushing forms a mating portion such as a groove or bass to mate with the leg 430.

Figure 11:
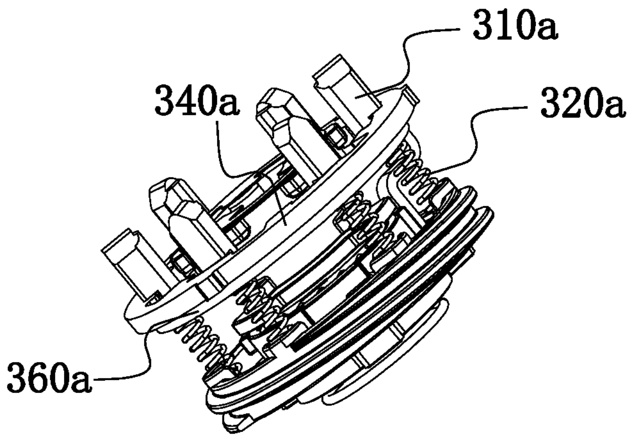
FIG. 11 is a view illustrating the internal structure of an impact drill according to a second example of the present application.
Figure 12:
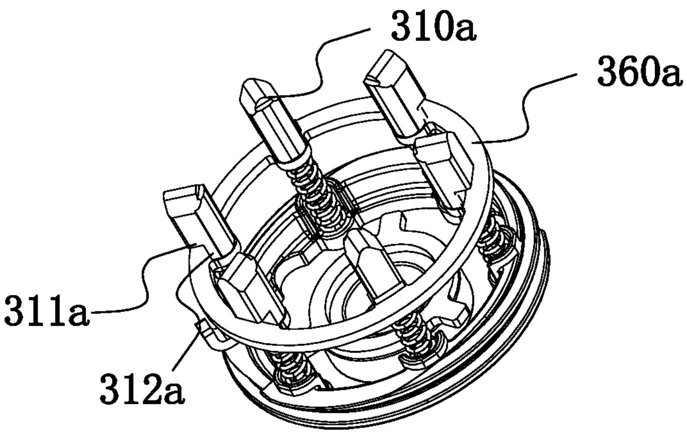
FIG. 12 is a view taken from another angle to illustrate the internal structure of the impact drill according to the second example of the present application.

In a second example of the present application, an impact drill is provided. With reference to FIG. 11 and FIG. 12, the impact drill includes multiple lock pins 310*a*, an annular gasket 360*a* and a biasing element 320*a*. The lock pins 310*a* are connected to the locking ring and configured to stop the rotation of the locking ring. The annular gasket 360*a* is securely connected to the multiple lock pins 310*a*. The biasing element 320*a* is connected to the annular gasket 360*a*. Moreover, the biasing element 320*a* provides a biasing force which causes the lock pins 310*a* to press against the locking ring. The impact drill further includes a function conversion member 340*a*. The function conversion member 340*a* can be rotated to a first position and a second position. When the function conversion member 340*a* is in the first position, the movement of the lock pins 310*a* relative to the housing assembly 120*a* along the first axis is stopped. Moreover, when the function conversion member 340*a* is in the second position, the lock pins 310*a* are capable of reciprocating relative to the housing assembly along the first axis. The annular gasket 360*a* is disposed to reduce the error in adjusting the function conversion member 340*a*. Optionally, the biasing element 320*a* is multiple small springs connected to the annular gasket 360*a* or a large spring connected to the annular gasket 360*a*. Optionally, the front end of the lock pins 310*a* forms a first step portion 311*a* and a second step portion 312*a*. The first step portion 311*a* is capable of abutting the stop portion. Moreover, the second step portion 312*a* is located at the side end of the function switching member 340*a*.

The preceding examples illustrate only the basic principles and features of the present application. The present application is not limited by the preceding examples. Various modifications and variations made without departing from the spirit and scope of the present application fall within the scope of the present application. The scope of the present application is defined by the appended claims and their equivalents.

What is claimed is:

1. An impact drill, comprising:

a motor;

a housing assembly configured to support the motor;

an output shaft capable of being driven by the motor to rotate around a first axis;

a transmission assembly comprising a locking ring rotatable relative to the housing assembly;

a lock pin connected to the locking ring and configured to limit rotation of the locking ring;

a biasing element configured to bias the lock pin such that the lock pin applies a locking force to stop the rotation of the locking ring;

a function conversion member rotatably mounted about the first axis, the function conversion member comprising a stop portion configured to stop movement of the lock pin along an axis parallel to the first axis and a release portion configured to allow the movement of the lock pin along the axis parallel to the first axis, the function conversion member forms an opening for the lock pin and the transmission assembly to pass through, the stop portion protrudes toward a center of the opening relative to the release portion, and the function conversion member can rotate relative to the housing assembly around the first axis so that the stop portion and the release portion are separately aligned or staggered with the lock pin along an axial direction of the first axis; and an operation member configured to drive the function conversion member to switch a stop state of the movement of the lock pin along the axial direction of the first axis, wherein the function conversion member and the operation member are mated with a groove and boss to form a stop structure to stop a movement of the function conversion member along the first axis, wherein the operation member drives the function conversion member to rotate solely around the first axis to selectively stop movement of the lock pin or allow movement of the lock pin along the first axis, and the locking ring includes locking teeth for abutting the lock pin.

2. The impact drill according to claim 1, wherein the transmission assembly further comprises a planet gear set and a gearbox, the planet gear set comprises a planet gear, a sun gear and a planet carrier, the planet gear is mounted on the planet carrier, the planet gear meshes with the sun gear, and the locking ring further comprises meshing teeth meshing with the planet gear.

3. The impact drill according to claim 1, wherein a front end of the lock pin forms a first step portion and a second step portion, the first step portion is capable of abutting the stop portion, and the second step portion is located at a side end of the function conversion member.

4. The impact drill according to claim 1, wherein the function conversion member is an annular structure, a middle portion of the function conversion member forms an opening for the lock pin to pass through, and the stop portion protrudes toward a center of the opening relative to the release portion.

5. The impact drill according to claim 1, further comprising:

an impact assembly comprising a fixed impact mechanism and a dynamic impact mechanism, wherein at least part of the fixed impact mechanism is securely connected to the housing assembly, the dynamic impact mechanism is movable with the output shaft along the first axis, the operation member is connected to the dynamic impact mechanism, and the operation member has a first state in which movement of the dynamic impact mechanism along an axial direction of the first axis is allowed and a second state in which the movement of the dynamic impact mechanism along the axial direction of the first axis is stopped.

6. The impact drill according to claim 5, wherein the dynamic impact mechanism forms a leg, the fixed impact mechanism is provided with a mating portion, and the dynamic impact mechanism is configured to be driven by the operation member to rotate around the first axis such that the mating portion and the leg are aligned or staggered in the axial direction of the first axis.

7. The impact drill according to claim 6, wherein the mating portion is a boss or a groove formed on the fixed impact mechanism.

8. The impact drill according to claim 5, wherein the impact assembly further comprises a bushing sleeved on an outer side of the dynamic impact mechanism, the dynamic impact mechanism forms a leg, the dynamic impact mechanism is capable of being driven by the operation member to rotate around the first axis, and the bushing forms a groove configured to mate with the leg.

9. The impact drill according to claim 1, wherein a plurality of lock pins are provided.

10. The impact drill according to claim 9, further comprising an annular gasket, wherein the annular gasket is connected to the plurality of lock pins.

11. The impact drill according to claim 10, wherein the biasing element is connected to the annular gasket.

12. The impact drill according to claim 1, wherein the operation member is a rotary drum sleeved on the housing assembly and the operation member is operable to move around the first axis to switch a state of the operation member and a position of the function conversion member.

13. The impact drill according to claim 12, wherein the function conversion member is configured to be driven by the operation member to rotate around the first axis.

14. The impact drill according to claim 1, wherein, when the stop portion abuts the lock pin, the impact drill is switched to a hammer shift mode or a drill shift mode and, when the lock pin is aligned with the release portion along the axis parallel to the first axis, the impact drill is switched to a screw shift mode.

15. An impact drill, comprising:

a motor;

a housing assembly configured to support the motor;

an output shaft capable of being driven by the motor to rotate around a first axis;

a transmission assembly comprising a locking ring rotatable relative to the housing assembly;

a lock pin connected to the locking ring and configured to stop rotation of the locking ring; and a function conversion member rotatably mounted about the first axis and restrained from movement along an axial direction of the first axis, the function conversion member further selectively connected to the lock pin by rotating the function conversion member about the first axis, wherein the function conversion member forms an opening for the lock pin and the transmission assembly to pass through, a stop portion protrudes toward a center of the opening relative to a release portion, and the function conversion member can rotate relative to the housing assembly around the first axis so that the stop portion and the release portion are separately aligned or staggered with the lock pin along the axial direction of the first axis, and wherein the function conversion member comprises a first position and a second position, when the function conversion member is in the first position, the function conversion member is connected to the lock pin and movement of the lock pin relative to the housing assembly along an axis parallel to the first axis is stopped, and, when the function conversion member is in the second position, the lock pin is capable of moving relative to the housing assembly along the axis parallel to the first axis.

16. An impact drill, comprising:

a motor;

a housing assembly configured to support the motor;

an output shaft capable of being driven by the motor to rotate around a first axis;

a transmission assembly comprising a locking ring rotatable relative to the housing assembly;

a plurality of lock pins connected to the locking ring and configured to stop rotation of the locking ring;

an annular gasket connected to the plurality of lock pins;

a biasing element connected to the annular gasket and configured to make the plurality of lock pins apply a locking force to stop the rotation of the locking ring; and a function conversion member rotatably mounted about the first axis and restrained from movement along an axial direction of the first axis, the function conversion member further selectively connected to the lock pin by rotating the function conversion member about the first axis, wherein the function conversion member forms an opening for the lock pin and the transmission assembly to pass through, the stop portion protrudes toward a center of the opening relative to the release portion, and the function conversion member can rotate relative to the housing assembly around the first axis so that a stop portion and a release portion are separately aligned or staggered with the lock pin along an axial direction of the first axis, and wherein the function conversion member comprises a first position and a second position, when the function conversion member is in the first position, the function conversion member is connected to the plurality of lock pins and movement of the plurality of lock pins relative to the housing assembly along an axis parallel to the first axis is stopped, and, when the function conversion member is in the second position, the plurality of lock pins are capable of moving relative to the housing assembly along the axis parallel to the first axis.

17. The impact drill according to claim 16, wherein the function conversion member comprises stop portions configured to stop the movement of the plurality of lock pins along the axis parallel to the first axis and release portions configured to allow the movement of the plurality of lock pins along the axis parallel to the first axis, when the function conversion member is in the first position, the stop portions abut the plurality of lock pins, and, when the function conversion member is in the second position, the plurality of lock pins are aligned with the release portions along the axis parallel to the first axis.

18. The impact drill according to claim 17, further comprising:

an operation member configured to stop movement of the function conversion member along the first axis and configured to drive the function conversion member to switch between the first position and the second position.

19. The impact drill according to claim 18, further comprising an impact assembly, wherein the impact assembly comprises a fixed impact mechanism and a dynamic impact mechanism, at least part of the fixed impact mechanism is securely connected to the housing assembly, the dynamic impact mechanism is movable with the output shaft along the first axis, the operation member is connected to the dynamic impact mechanism, and the operation member has a first state in which movement of the dynamic impact mechanism along an axial direction of the first axis is allowed and a second state in which the movement of the dynamic impact mechanism along the axial direction of the first axis is stopped.

* * * * *